April 27, 1926.

T. P. BAHR

AUTOMOBILE BED

Filed April 29, 1925

1,582,500

INVENTOR.

T. P. Bahr.

Patented Apr. 27, 1926.

1,582,500

UNITED STATES PATENT OFFICE.

THEODORE P. BAHR, OF SAN FRANCISCO, CALIFORNIA.

AUTOMOBILE BED.

Application filed April 29, 1925. Serial No. 26,681.

*To all whom it may concern:*

Be it known that I, THEODORE P. BAHR, a citizen of the United States, residing at San Francisco, in the county of San Francisco and State of California, have invented a new and useful Automobile Bed, of which the following is a specification.

My invention relates to improvements in automobile beds of the class wherein the back cushion is hinged so it can be turned down to span the space between the front and rear seats whereby, a continuous cushioned bed is formed; heretofore it has been difficult to hinge the back to suit the span in the various makes of automobiles and at the same time avoid forming unyielding portions in the cushions on account of the mode of construction now in use.

The object of this invention is to obviate this difficulty by providing means for retaining the entire cushion surface without regard to the length of the hinged portion required.

Another object is to provide means of construction whereby a strong, simple and comfortable bed is quickly formed.

Another object is to make it possible to equip automobiles now in use with this means.

Other objects will appear as the description proceeds.

These objects are attained by the mechanism shown in the accompanying drawings in which—

Similar numerals refer to similar parts throughout the several views.

Figure 1:
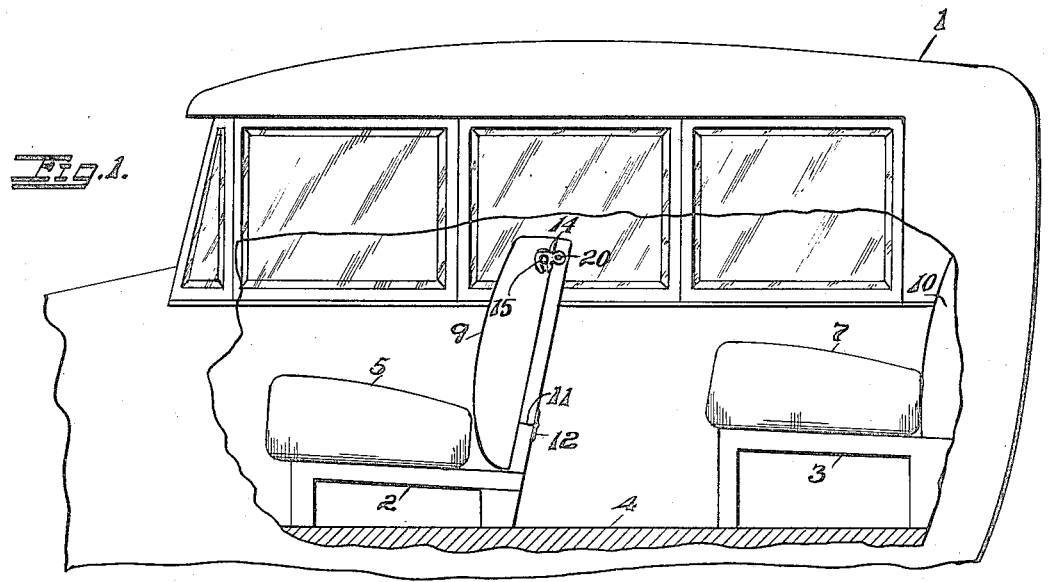
Figure 1 shows an automobile body with parts broken away to show the application of the device and arrangement of seats.

The numeral 1 indicates the body of an automobile, 2 the front seat, and 3 the rear seat; the seats are fixed to the floor 4 of the car. 5 is the front seat cushion with springs 6.

7 is the rear seat cushion with springs 8. 9 indicates the back cushion of the front seat, and 10 the back cushion of the rear seat. The back cushion of the front seat is hinged at 11 by means of the hinges 12 and 13, and is held in the upright position by the hooks 14 and bolt 15.

The hook 14 has the cam like slot 16 and the beveled points 17 and 18 which act to draw the hinged section tightly in place. For convenience in opening and closing the hook the projecting member 19 is provided; the hook is pivoted at 20. The back section 9 consists of the cushion fabric 21, and has the springs 22 which may be of any form.

The back 23 is usually of metal and is cut at 11 transversely; on each side of the cut are fixed transverse strips 24 and 25, which are preferably of wood, but may be metal in any form. The upper strip 24 has the overhanging member 26 fixed to it, and the portion 26 has the end of the cushion fixed thereto. 27 represents the usual padding, and the end of the cushion is usually rounded out by the padding as shown at 27'.

In operation the hooks are released and the hinged cushion is turned down on to a support 28 which may be of any convenient form to be stored away when not in use.

It will be seen from the above description that a continuous cushion is had the full length of the bed, whereas if the hinged portion was cut straight across on the line of the hinge, it would bring the unyielding support of the end of the cushion where it would be very uncomfortable both for riding or sleeping purposes.

Figure 2:
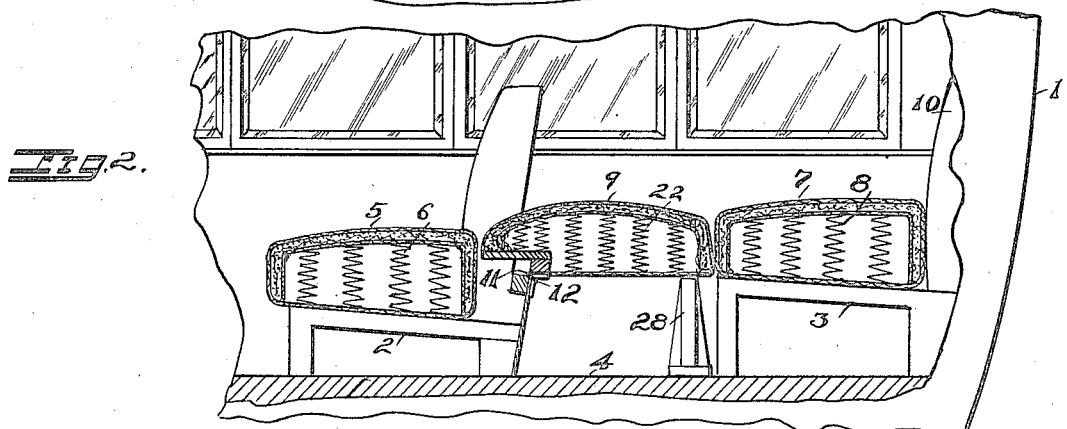
Figure 2 is a longitudinal section of the body showing the bed formed in section.
Figure 4:
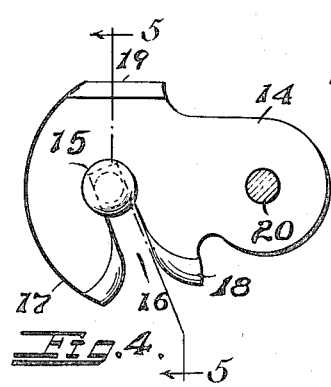
Figure 4 is an enlarged view of the hook in position.
Figures 3, 5:
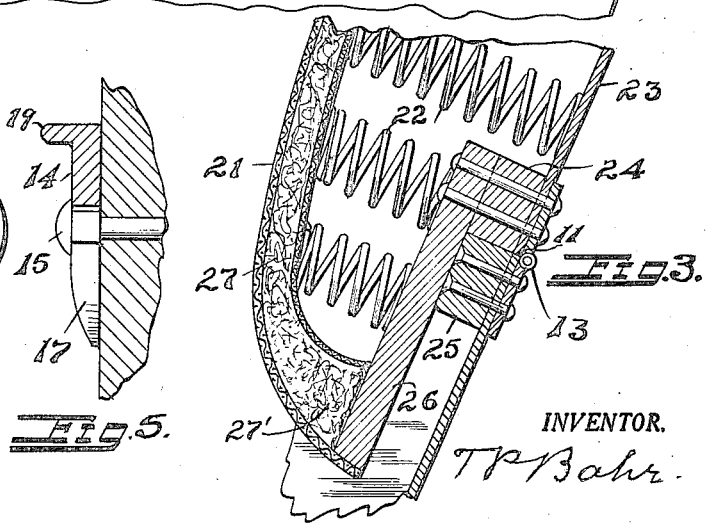
Figure 3 is an enlarged sectional view of the hinge portion.
Figure 5 is a section on line 5—5 of Figure 4.

It will be noticed that the back cushion is higher than the seat cushions, see Figure 2; this is done to allow for the difference in tension of the springs, and is raised enough to bring all cushions on a level when a person is lying on the bed.

Having thus described my invention, what I claim as new and desire to secure by Letters Patent of the United States, is as follows, express reservations being made of permissible modifications.

A hinged joint of the class described, comprising a hinged seat back, of sheet metal, upper and lower reinforcing strips fixed to the meeting edges of said joint, a cushion mounted on the upper portion of said seat back, a downwardly projecting member fixed to said upper reinforcing strip, and means for fastening the lower end of said cushion to said downwardly projecting member.

THEODORE P. BAHR.